United States Patent

[11] 3,594,062

| [72] | Inventor | David Robert Disley<br>Harlow, England |
|---|---|---|
| [21] | Appl. No. | 815,152 |
| [22] | Filed | Apr. 10, 1969 |
| [45] | Patented | July 20, 1971 |
| [73] | Assignee | The Rank Organization Limited<br>London, England |
| [32] | Priority | Apr. 11, 1968 |
| [33] | | Great Britain |
| [31] | | 17625 |

[54] SIGHTING TELESCOPE WITH FLEXIBLE EYEGUARD
5 Claims, 5 Drawing Figs.

| [52] | U.S. Cl. | 350/17,<br>350/57 |
|---|---|---|
| [51] | Int. Cl. | G02b 23/16 |
| [50] | Field of Search | 350/72,<br>248, 249, 17, 10, 312, 179, 57, 58 |

[56] References Cited
UNITED STATES PATENTS

| 3,390,931 | 7/1968 | Luning et al. | 350/57 |
|---|---|---|---|
| | | FOREIGN PATENTS | |
| 910,142 | 5/1954 | Germany | 350/58 |

*Primary Examiner*—David Schonberg
*Assistant Examiner*—Toby H. Kusmer
*Attorney*—Holcombe, Wetherill & Brisebois

ABSTRACT: Light-obscuring means are provided for a telescope having internal illumination means to prevent the escape of such illumination through the eyepiece of the telescope except when an observer applies his eye to the eyepiece. In each of the examples given, an eye guard is displaceable when the observer presses his face against the eyepiece and this causes the movement of shutter flaps that are attached to the eye guard away from a setting in which the light path through the eyepiece is closed. The eye guard is of a flexible material the resilience of which returns it, and therefore also the shutter flaps to their previous positions when the observer moves away from the eyepiece.

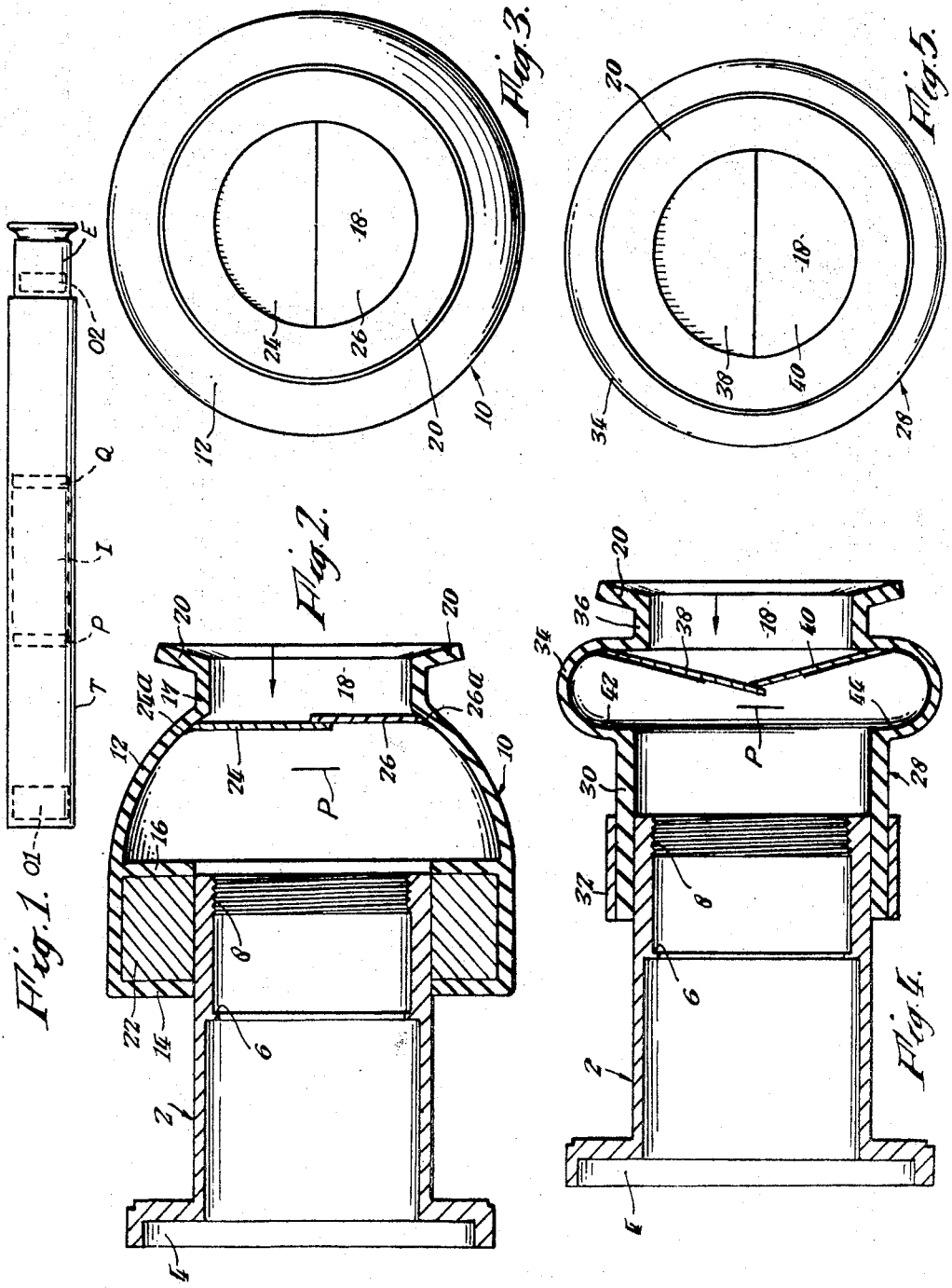

SIGHTING TELESCOPE WITH FLEXIBLE EYEGUARD

This invention relates to sighting telescopes provided with internal illumination e.g. for a sighting mark or graticule, or from an image-intensifying system.

In such internally illuminated telescopes, light passing out of the eyepiece will fall upon the observer's face when he withdraws his eye from the eyepiece. In military applications, if this occurs under battlefield conditions and when there is otherwise near total darkness, it can make use of the telescope dangerous.

According to the invention, in a telescope provided with internal illumination means and comprising an eyepiece on which is an eye guard so carried as to be displaceable from an end position against biassing means by the application of pressure to said eye guard, shutter means within the eyepiece being attached by hinge means to a portion of the eye guard, at least said portion of the guard being of a flexible nature and being normally so disposed that the shutter means obscure the passage of light from the eyepiece but flexure of the eye guard, as when an observer applies his eye to the telescope, being arranged to swing the shutter means on said hinge means clear of the light path.

Conveniently, the shutter means comprise at least two flaps that overlap each other and that extend over an area greater than that occupied by the light path through the eyepiece so that they can be displaced completely clear of said path when required.

Thus, the internal illumination cannot escape from the telescope until the eye guard is placed under pressure i.e. as the observer applies his eye to the eye guard—and as he withdraws from the instrument the illumination is again cut off while his face is still in contact with the eye guard.

The invention will now be described by way of example only and with reference to the accompanying drawings wherein:

FIG. 1 is a schematic illustration of a sighting telescope having an image-intensifying system and incorporating and eyepiece according to the present invention;

FIGS. 2 and 3 show an axial sectional view and an end elevation respectively of one form of eyepiece that can be incorporated in the telescope of FIG. 1; and FIGS. 4 and 5 show an axial sectional view and an end elevation of an alternative form of eyepiece according to the invention.

Referring to FIG. 1 of the drawings, a telescope T intended for night viewing is provided with a lens system 01 receiving external illumination and forming an image of the field of view on pickup screen P of an image intensifier I. The resulting brighter image falls upon output screen Q of the intensifier and is viewed by an observer through a second lens system 02 mounted in the eyepiece E of the telescope.

It is with the construction of the eyepiece that the invention is more particularly concerned and two alternative embodiment will now be described. In each embodiment, the eyepiece comprises a barrel 2 having at one end a socket 4 which forms part of attachment means for the eyepiece to the main body of the telescope (not shown). Each barrel has a shoulder 6 which locates the optical elements (not shown) of the eyepiece which are secured by a collar (not shown) screwed into a threaded portion 8 of each barrel.

The eyepiece mounts a molded rubber eye guard 10. The wall 12 of the eye guard has two spaced inwardly directed circular flanges 14 and 16, and these flanges engage a ring 22 fixed to the barrel 2 and thus secure the eye guard to the barrel. Rearwardly of the flanges, the eye guard has a tapering cross section and the profile of the wall 12 is curved inwardly towards the axis of the eyepiece. A cylindrical continuation portion 17 of the wall 12 defines an aperture 18 and terminates in an outwardly angled rim 20.

The blanking means for this eyepiece comprise two substantially semicircular flaps 24 and 26 which are in each case connected by a small portion 24a, 26a of their respective semicircular peripheries to the wall of the eye guard, either by being bonded thereto or by being moulded integrally with the eye guard.

The closed position of the eyepiece is as shown in FIGS. 2 and 3, the flaps overlying each other. In use, the eye of the observer is applied to the aperture 18, and the rim 20 of the eye guard bears against the face of the observer adjacent his eye. Further movement of the observer's face against the eyepiece, until the pupil of his eye occupies the position P in FIG. 1, causes the resilient body of the eye guard to flex and thus swing the flaps 24 and 26 forwards to open the light path through the eyepiece. When the observer withdraws his eye this allows the curved profile portion of the wall 12 to resume its original form and the flaps swing back and close the light path again.

The eyepiece shown in FIGS. 4 and 5 has a molded rubber eye guard 28 which has a cylindrical wall 30 mounted on the barrel 2 of the eyepiece and secured to it by a clamping ring 32. The free end of the wall 30 has a toroidal continuation portion 34 which adjoins a cylindrical wall 36 defining an aperture 18 and having a rim 20 extending outwardly from it.

The blanking means for this eyepiece comprise two substantially semicircular flaps 38 and 40 whose edges are not in this case directly attached to the body of the eye guard. The flaps are made of a resilient material and are mounted on respective flexible narrow strips 42 and 44 which are shaped to extend contiguously to the continuation portion 34 and cylindrical wall 30 of the eyeguard, being secured to the eye guard at their ends adjacent the barrel 2. Similarly to the first embodiment, the flaps may be moved to open the light path by axial deformation of the eye guard by pressure from the observer's face on the rim 20; this deformation will take place mainly at the wall of the toroidal continuation portion 34, and the contiguous flexible strips 42 and 44 will bend to accommodate the deformation thus swinging the flaps outwards. As the flaps swing, they are flexed from their initial substantially flat configuration to one in which their initially straight edges bear against the cylindrical wall 30 of the eye guard and therefore become curved. As before, the letter P indicates the position of the pupil of the observer when the light path is opened. When pressure is removed from the eyeguard it resumes its original configuration, the flaps swinging back to close off the light path.

Both the described embodiments have the further advantage that the covering of the objective of the eyepiece may prevent condensation of water upon the lenses in unfavorable weather conditions, since the blanking means will tend not only to prevent the access of moist air to the lenses, but also to conserve any heat imparted by the illumination means to the eyepiece.

I claim:

1. In a telescope provided with internal illumination means transmitting light to an eyepiece, the improvement consisting of an eye guard mounted at said eyepiece, said eye guard comprising a flexible portion connected to said eyepiece and a rim portion displaceable relative to said eyepiece by flexing of said flexible portion, said flexible portion constituting biasing means urging said rim portion to an end position from which it is movable by the application of pressure when an observer's eye is applied to the telescope, shutter means being disposed within the eyepiece comprising at least two flaps that overlap each other in the closed position and are attached to said flexible portion of eye guard, said flexible portion being disposed when said rim portion is in said end position so that the flaps overlap and bear upon each other to obscure the passage of light from the eyepiece but being arranged to flex upon movement of the rim portion from said end position and thereby swing the flaps attached thereto to an open position away from the plane in which they are located when in the closed position and clear of the light path from said internal illumination means through the eyepiece.

2. A telescope according to claim 1, each flap is attached along a portion of its periphery to a contiguous location on the eye guard.

3. A telescope according to claim 1 comprising a flexible strip for each flap by means of which that flap is attached to said flexible portion, said flexible strip being positioned to be flexed with said flexible eye guard portion by displacement of said rim portion.

4. A telescope according to claim 1 wherein the eye guard comprises a circular section wall region in which the diameter varies, said variation including a smaller diameter portion interposed between a larger diameter portion and an opening for the observer's eye, said flaps lying in the region of said smaller diameter portion when they close the light path to the observer's eye and being swingable forwardly to said larger diameter portion when the eye guard is moved against biasing means.

5. A telescope according to claim 1 in which a peripheral portion of each flap is integrally connected to a contiguous location on the flexible portion of said eye guard.